United States Patent [19]

Fajula et al.

[11] Patent Number: 4,834,961

[45] Date of Patent: May 30, 1989

[54] ALUMINOSILICATE ZEOLITE HAVING AN OFFRETITE STRUCTURE

[75] Inventors: Francois Fajula, Hérault; Francois Figueras; Latifa Moudafi, all of Héault, France

[73] Assignee: Centre National de la Recherche Scientifique, Paris, France

[21] Appl. No.: 906,017

[22] Filed: Sep. 11, 1986

Related U.S. Application Data

[63] Continuation of Ser. No. 676,393, Oct. 17, 1984, abandoned.

[30] Foreign Application Priority Data

Mar. 7, 1983 [FR] France ................................. 8303804

[51] Int. Cl.$^4$ ............................................. C01B 33/28
[52] U.S. Cl. .................................... 423/328; 423/329; 502/60; 502/77
[58] Field of Search .................. 423/328, 329; 502/60, 502/77

[56] References Cited

U.S. PATENT DOCUMENTS

| | | | |
|---|---|---|---|
| 3,578,398 | 5/1971 | Jenkins | 423/328 |
| 3,674,425 | 7/1972 | Robson | 423/328 |
| 3,758,539 | 9/1973 | Frank | 423/329 |
| 3,947,482 | 3/1976 | Albers | 423/328 |
| 4,086,186 | 4/1978 | Rubin et al. | 423/329 |
| 4,093,699 | 6/1978 | Sand | 423/118 |
| 4,400,328 | 8/1983 | Takegami et al. | 423/328 |
| 4,503,032 | 3/1985 | Breck | 423/328 |
| 4,522,800 | 1/1985 | Baltes et al. | 423/329 |
| 4,526,878 | 7/1985 | Takegami et al. | 423/329 |
| 4,687,653 | 8/1987 | Arika et al. | 423/329 |

FOREIGN PATENT DOCUMENTS

| | | | |
|---|---|---|---|
| 1188043 | 4/1970 | United Kingdom | 423/328 |
| 1345363 | 1/1974 | United Kingdom | 423/328 |
| 1413470 | 11/1975 | United Kingdom | 423/329 |

OTHER PUBLICATIONS

Latifa Moudafi et al., "Synthesis of TMA Offretite from Natural Silicates" Applied Catalysis 20 (1986) 189-203.
Occelli et al., Quaternary Ammonium Ion Effects on the Crystallization of Offretite-Erionite Type Zeolites Part I Synthesis and Catalytic Properties, Zeolites, 1987, vol. 7, May 265-271.
Howden, M. G. Synthesis of Offretite, Part I Using Various Organic Compounds as Templates, Zeolites, 1987, vol. 7, May, pp. 255-259.
Francois Fajula et al., "Influence of the Mosphology of the Particles on the Thermal Stability of Offretite" Nouveau Journal de Chimie, vol 8, No. 4, 1984, pp. 207-211.

Primary Examiner—Gary P. Straub
Attorney, Agent, or Firm—Browdy and Neimark

[57] ABSTRACT

A crystalline alumino-silicate having a powder X-ray diffraction diagram, a specific area, and a porous volume to nitrogen corresponding to offretite, and containing at least one metal selected from the groups I, II, VI, VII, VII, rare earth group, and/or at least an ammonium or quaternary ammonium group, presenting an aspect of the crystals as observed by electron microscopy in the form of hexagonal prisms with well defined edges of a length of 0.5 to 2.5 micrometers and a width of 0.1 to 1 micrometer.

3 Claims, 6 Drawing Sheets

ALUMINOSILICATE ZEOLITE HAVING AN OFFRETITE STRUCTURE

This is a continuation of application Ser. No. 676,393 filed 10/17/84 now abandoned.

This invention relates to an improved crystalline aluminosilicate or improved zeolite with the structure of offretite and presenting particularly interesting characteristics mainly in the domain of catalysis, adsorption, gas separation or ionic exchanges.

It is known that offretites are zeolites having a structure corresponding to a stack of cancrinitic cages and hexagonal prisms. The so constituted network is open and presents channels therein accessible thorugh pores having a diameter of 6 to 7 Å. These zeolites are catalysts potentially interesting for transformation reactions of hydrocarbons such as cracking, hydrocracking, isomerization and hydro-isomerization, the reactions of isomerization, dealkylation and alkylation of aromatics, the reactions of conversion of methanol into gasolines and into olefins, deparaffining and hydratation of olefins, and so on.

However, notwithstanding their good properties as catalysts the presently known synthesis offretites have not sufficient thermal stability. As a matter of fact, substantial loss of crystallinity is experienced during a prolonged heating and/or a heating at a high temperature as well as a coking, and therefore, a consecutive loss of activity and/or selectivity which is detrimental to the efficiency of industrial operations in certain operations such as for example in the catalysis domain. This is among others the case with catalyst regeneration operations, cracking operations at high temperatures, and so on.

This invention, however, provides for a novel crystalline aluminosilicate having a powder X-ray diffraction diagram, specific area and porous volume to nitrogen, which are characteristic of the offretite, and containing at least one metal selected from the groups I, II, VI, VII and VIII (of the Periodic Table), the group of rare earths, and/or at least an ammonium or quaternary ammonium group, such novel aluminosilicate being characterized by having an aspect of the crystals observed through electronic scanning microscopy which is in the form of hexagonal prisms with very well defined edges of a length of 0.5 to 2.5 micrometers and a width of 0.1 to 1 micrometers.

According to other characteristics:

the novel crystalline alumino-silicate such as defined above has a thermal stability resulting in the absence of modification in crystallinity after a heating that may reach 1050° C., this novel crystalline alumino-silicate can also be in protonic form and present in particular:

an adsorption rate of 6 to 10% by weight of cyclohexane at 20° C. under a pressure of 84 Torrs and from 15 to 20% of water at 20° C. under a pressure of 20 Torrs;

a good time stable catalytic activity evaluated by reference to a conversion rate of 6 to 12% in the cracking of n-hexane at 480° C. with a spatial speed of 3 $h^{-1}$;

a high selectivity of 100% evaluated by reference to a hydratation reaction of an olefin in alcohol;

a time stable conversion rate of 17% in the reaction of cyclohexane at 450° C. with a spatial speed of 1 $h^{-1}$.

Such a crystalline alumino-silicate belonging to the offretite family such as defined above is novel in the Applicant's knowledge, in that, depending on the form in which it is found, it presents not only an assembly or combination of properties and characteristics which do not exist in the other known synthesis offretites, but also and above all in that it has a very particular crystalline aspect such as defined above, whereas these other synthesis offretites have generally the form of balls or small sticks as observed by electronic microscopy.

Moreover, the alumino-silicate of this invention is particularly interesting in the catalysis domain in that it presents, contrary to the other known offretites, in addition to the above characteristics, a stress index lower than 2 and constant during the working time of the catalyst.

The process which permits to obtain the products according to the invention is a crystallization process of any known type, on the condition that it is started from an alkaline mother solution containing at least one metal belonging to one of the above mentioned groups, an alumina source and possibly a quaternary ammonium salt in such quantities that said solution corresponds to the following molar ratios:

$SiO_2/Al_2O_3 = 5\text{--}40$ $SiO_2/Alkaline = 1\text{--}2.6$

Quaternary aluminum salt/Alkaline = 0–0.3

$H_2O/Alkaline = 27\text{--}50$.

The sources of silica and/or alumina may be of any type. Thus, alumino-silicates of natural origin (for example, of the kaolin type, calcined or not) can be utilized.

As an example of a crystallization process that can be used one can mention the process based on the principle of controlled ageing of the aqueous alkaline solution or the process based on the principle of initiation and development of the crystallization through addition to a first aqueous alkaline mother solution (called of "synthesis") of a small quantity of a second aqueous solution (called of "nucleation") having a composition analogous to that of the first solution but containing a so-called "nucleation" agent (in this case, tetramethylammonium hydroxide or chloride-TMAOH or TMACl, for example).

These two principles have already been taken advantage of for obtaining synthesis offretites differing in their crystalline structure and which do not present the combination of the characteristics and properties of the product in accordance with this invention. Only for memory's sake and by way of reference British Pat. No. 1 188 043 and U.S. Pat. Nos. 3,758,534, 3,947,482 and 3,578,398 can be cited, such patents utilizing either particular starting compounds, or particular proportions or particular operative conditions leading to various offretites, the structures, characteristics and properties of which result from the respective procedure used.

This invention will be better understood in the light of the following examples which are given in a purely illustrative and not at all limitative manner.

EXAMPLE 1

Obtaining the product according to this invention through crystallization initiated from metakaolin (kaolin burned at 500° C. in air for 10 hours):

(1) A "nucleation" gel A of the following molar composition is prepared: $6K_2O$, $2.56(Me_4N)_2O$, $Al_2O_3$, $15.3SiO_2$, $280H_2O$, from $H_2O$: 15 g; KOH: 2.2 g; TMAOH, $5H_2O$: 3.05 g; metakolin: 0.73 g; silica 2.63 g ($Me_4N$ represents the tetramethylammonium radical and TMAOH is the tetramethylammonium hydroxide).

The mixture is agitated for 3 hours at the ambient temperature, then aged without stirring for 72 hours.

(2) A second "synthesis" gel B of the following molar composition: $6K_2O$; $Al_2O_3$; $15.3SiO_2$; $254H_2O$ is obtained from the same components as for gel A but in the absence of TMAOH, $5H_2O$.

(3) From aged gel A and freshly prepared gel B, three solutions AB are prepared:

one containing 25% of A and 75% of B, (average composition: $6K_2O$; $0.64(Me_4N)_2O$; $Al_2O_3$; $15.3SiO_2$; $260H_2O$)

one containing 5% of A and 95% of B, ($6K_2O$; $0.128(Me_4N)_2O$; $Al_2O_3$; $15.3SiO_2$; $255H_2O$)

one containing 2% of A and 98% of B. ($6K_2O$; $0.05(Me_4N)_2O$; $Al_2O_3$; $15.3SiO_2$; $254H_2O$)

Each of these solutions is put into a glass phial, sealed and heated under agitation for 17 hours at 150° C. After filtration, washing and drying, the three solids obtained present an X-ray diffractogram characteristic of offretite (see Tables 1, 2 and 3 hereinafter) not containing any other crystallized phase.

Examination of the zeolite crystals obtained from the three solutions AB through electronic microscopy shows that these are in form of hexagonal prisms of regular shapes of a length of 0.5 to 2.5 micrometers and of a width of 0.1 to 1 micrometer. (The presently known synthetic offretites generally have the form of balls or cigars).

After calcination in air at 470° C., the solid prepared from the AB solution with 25% of A (zeolite 3-1) has a specific area of 412 $m^2g^{-1}$ and a porous volume (measured with nitrogen) of 0.26 $cm^3g^{-1}$; the solid prepared from the AB solution with 5% of A (zeolite 3-2) as a specific area of 396 $m^2g^{-1}$ and a porous volume of 0.25 $cm^3g^{-1}$ and the solid prepared from the AB solution with 2% of A (zeolite 3-3) has a specific area of 280 $m^2g^{-1}$ and a porous volume of 0.16 $cm^3g^{-1}$.

Elementary analysis effected more especially on zeolite 3-2 gives the following chemical composition as expressed in oxide moles:

| $Al_2O_3$ | 0.88 $K_2O$ |
|---|---|
| 10.7 $SiO_2$ | 0.03 $Na_2O$ |
| | 0.1 $(Me_4N)_2O$ |

After heating the zeolite in air flow at 910° C. for one hour, a X-ray inspection revealed no loss of crystallinity. Moreover, such zeolite was exchanged in protonic form (70% of exchange) by using methods well known in the art (exchange by a solution of an ammonium salt followed by calcination at 500° C. in air to decompose the $NH^+_4$ and $TMA^+$ ions).

The so obtained product is capable of adsorbing 6% by weight of cyclohexane at 20° C. under a pressure of 84 Torrs and 16% by weight of water

TABLE 1

| $\theta°$ | dÅ | h k l | $\frac{I}{I_o} \times 100$ |
|---|---|---|---|
| 3.85 | 11.471 | 100 | 100 |
| 5.85 | 7.5571 | 001 | 30 |
| 6.70 | 6.6019 | 110 | 35 |
| 7.00 | 6.3203 | 101 | 15 |
| 7.75 | 5.7118 | 200 | 18 |
| 9.72 | 4.5622 | 201 | 34 |
| 10.25 | 4.3286 | 210 | 44 |
| 11.85 | 3.7509 | 211 | 85 |
| 12.40 | 3.5869 | 102 | 63 |
| 13.50 | 3.2995 | 112 | 24 |
| 14.15 | 3.1508 | 202 | 29 |
| 15.70 | 2.8464 | 212 | 72 |
| 16.75 | 2.6726 | 302 | 17 |
| 18.07 | 2.4832 | | |

$$\begin{cases} a = 13.2664 \text{ Å} \\ c = 7.5466 \text{ Å} \end{cases}$$

TABLE 2

| $\theta°$ | dÅ | h k l | $\frac{I}{I_o} \times 100$ |
|---|---|---|---|
| 3.90 | 11.324 | 100 | 100 |
| 5.80 | 7.6220 | 001 | 25 |
| 6.72 | 6.5823 | 110 | 58 |
| 7.02 | 6.3024 | 101 | 13 |
| 7.75 | 5.7118 | 200 | 11 |
| 9.75 | 4.5483 | 201 | 32 |
| 10.30 | 4.3078 | 210 | 60 |
| 11.70 | 3.7983 | 002 | 37 |
| 11.90 | 3.7353 | 211 | 111 |
| 12.45 | 3.5728 | 102 | 78 |
| 13.55 | 3.2875 | 112 | 28 |
| 14.25 | 3.1291 | 202⁻· | 48 |
| 15.35 | 2.9097 | 311 | 17 |
| 15.80 | 2.8289 | 212 | 79 |
| 16.80 | 2.6649 | 302 | 22 |
| 18.15 | 2.4726 | | |

$$\begin{cases} a = 13.0312 \text{ Å} \\ c = 7.5119 \text{ Å} \end{cases}$$

TABLE 3

| $\theta°$ | dÅ | h k l |
|---|---|---|
| 3.80 | 11.622 | 100 |
| 5.82 | 7.5959 | 001 |
| 6.64 | 6.6613 | 110 |
| 7.00 | 6.3203 | 101 |
| 7.70 | 5.7487 | 200 |
| 9.70 | 4.5715 | 201 |
| 10.22 | 4.3412 | 210 |
| 11.62 | 3.8241 | 300 |
| 11.80 | 3.7666 | 211 |
| 12.40 | 3.5869 | 102 |
| 13.25 | 3.3606 | 220 |
| 14.15 | 3.1508 | 202 |
| 15.27 | 2.9245 | 311 |
| 15.60 | 2.8642 | 400 |
| 15.70 | 2.8464 | 210 |
| 16.72 | 2.6773 | 302 |
| 18.07 | 2.4832 | |

$$\begin{cases} a = 13.4683 \text{ Å} \\ c = 7.5455 \text{ Å} \end{cases}$$

at 20° C. under a pressure of 20 Torrs.

Moreover, the product being applied as a catalyst in cracking n-hexane leads to a conversion equal to 12% stable in time at 480° C. (conversion unchanged after 24 hours of operation) and with a spatial speed (hydrocarbon weight/catalyst weight × hour) of 3 $h^{-1}$.

In dealkylation of cumene in propene and benzene a conversion of 7% is obtained at 400° C. and a spatial speed of 0.15 $h^{-1}$.

EXAMPLE 2

Obtaining the product of the invention from kaolin through direct crystallization:

A solution having the molar composition: 6.9K$_2$O; 2.97(Me$_4$N)$_2$O; Al$_2$O$_3$; 17.5SiO$_2$; 425H$_2$O is prepared from H$_2$O 20 g; KOH 2.2 g; kaolin 0.73 g; TMAOH, 5H$_2$O 3.05 g; silica 2.63 g.

The mixture is submitted the agitation at the ambient temperature for 3 hours, transferred into a glass vessel which is sealed and heated for 17 hours at 150° C. The solid recovered, washed and dried presents an X-ray diffractogram characterizing the offretite as shown by Table 4 hereinbelow.

TABLE 4

| θ° | dÅ | h k l |
|---|---|---|
| 3.80 | 11.622 | 100 |
| 5.80 | 7.622 | 001 |
| 6.65 | 6.6513 | 110 |
| 7.00 | 6.3203 | 101 |
| 7.70 | 5.7487 | 200 |
| 9.68 | 4.5762 | 201 |
| 10.24 | 4.3328 | 210 |
| 11.80 | 3.7666 | 211 |
| 12.35 | 3.6012 | 102 |
| 13.50 | 3.2995 | 112 |
| 14.10 | 3.1617 | 202 |
| 15.65 | 2.8553 | 212 |
| 16.70 | 2.6804 | 302 |

Chemical analysis of the solid leads to the following composition:

| Al$_2$O$_3$ | 0.86 K$_2$O |
|---|---|
| 16.43 SiO$_2$ | 0.03 Na$_2$O |
|  | 0.11 (Me$_4$N)$_2$O |

Its specific area after calcination at 540° C. in air is 180 m$^2$g$^{-1}$ and its porous volume is 0.13 cm$^3$g$^{-1}$.

The product obtained after exchange by protons and activation and used as a catalyst leads to a conversion of 6% in cracking n-hexane at 480° C. with a spatial speed of 3 h$^{-1}$.

EXAMPLE 3

Obtaining the product according to the invention through crystallization initiated from kaolin or metakaolin in gel A from uncalcined halloysite in gel B:

(1) A "nucleation" gel A is prepared from kaolin or metakaolin having the composition comprised within the following range: 1.96–15.8K$_2$O; 0.1–6.8(Me$_4$N)$_2$O; Al$_2$O$_3$; 5–40SiO$_2$; 120–960H$_2$O.

This gel is left to age for 72 hours at ambient temperature:

(2) A "synthesis" gel B of the following composition: 10K$_2$O; Al$_2$O$_3$; 25SiO$_2$; 480H$_2$O is prepared from: H$_2$O 15 g; KOH 2.2 g; Halloysite 0.57 g, silica 2.65 g.

An AB solution with 5% of A is made. The same procedure as that described in Example 1 leads to a zeolite having the X-ray spectrum characterizing the offretite without any other crystallized phase as results from Table 5 hereinbelow.

TABLE 5

| θ° | dÅ | h k l | $\frac{I}{I_o} \times 100$ |
|---|---|---|---|
| 3.85 | 11.471 | 100 | 100 |
| 5.86 | 7.5442 | 001 | 21 |
| 6.70 | 6.6019 | 110 | 34 |
| 7.05 | 6.2757 | 101 | 10 |
| 7.75 | 5.7118 | 200 | 11 |
| 9.75 | 4.5483 | 201 | 22 |
| 10.30 | 4.3078 | 210 | 34 |
| 11.70 | 3.7983 | 002 | 23 |

TABLE 5-continued

| θ° | dÅ | h k l | $\frac{I}{I_o} \times 100$ |
|---|---|---|---|
| 11.90 | 3.7353 | 211 | 53 |
| 12.45 | 3.5728 | 102 | 41 |
| 13.55 | 3.2875 | 112 | 16 |
| 14.20 | 3.1399 | 202 | 23 |
| 15.33 | 2.9134 | 311 | 7 |
| 15.75 | 2.8376 | 212 | 50 |
| 16.80 | 2.6649 | 302 | 12 |
| 18.10 | 2.4792 | | |

$$\begin{cases} a = 13.2664 \text{ Å} \\ c = 7.5271 \text{ Å} \end{cases}$$

Its elementary analysis gives the following composition:

| Al$_2$O$_3$ | 1.37 K$_2$O |
|---|---|
| 7.66 SiO$_2$ | 0.04 Na$_2$O |
|  | 0.01 (Me$_4$N)$_2$O |

The zeolite crystals examined by electronic scanning microscopy have the same appearance as those obtained in the preceding Examples.

After calcination in air at 450° C. its specific area is 337 m$^2$g$^{-1}$ and its porous volume 0.25 cm$^3$/g. A differential thermal analysis (heating rate 10° C. min.$^{-1}$) does not show any loss in crystallinity up to 1050° C.

EXAMPLE 4

Obtaining the product according to the invention through crystallization initiated from kaolin (uncalcined):

(1) A "nucleation" gel A of the following composition: 8.89K$_2$O; 3.8(Me$_4$N)$_2$O; Al$_2$O$_3$; 22SiO$_2$; 415H$_2$O is obtained from: water 15 g; KOH 2.2 g; TMAOH, 5H$_2$O 3.05 g; kaolin 0.57 g; silica 2.63 g.

Such gel is left to age for 72 hours at ambient temperature.

(2) A "synthesis" gel B having the following composition: 8.89K$_2$O; Al$_2$O$_3$; 22SiO$_2$; 380H$_2$O is prepared in the same manner as gel A but without TMAOH. Such gel is heated at 60°–80° C. up to kaolin dissolution.

A solution AB with 5% of A is made; it is treated as in the Example 3.

The obtained solid presents an X-ray spectrum characteristic of offretite (see Table 6 hereinbelow) without any other crystallized phase. The obtained crystals are identical to those described in Example 1 and their chemical composition corresponds to:

| Al$_2$O$_3$ | 1.02 K$_2$O |
|---|---|
| 7.8 SiO$_2$ | 0.03 Na$_2$O |
|  | 0.01 (Me$_4$N)$_2$O |

TABLE 6

| θ° | dÅ | h k l | $\frac{I}{I_o} \times 100$ |
|---|---|---|---|
| 3.85 | 11.471 | 100 | 100 |
| 5.87 | 7.5314 | 001 | 22 |
| 6.72 | 6.5823 | 110 | 38 |
| 7.01 | 6.3113 | 101 | 12 |
| 7.75 | 5.7118 | 200 | 17 |
| 9.75 | 4.5483 | 201 | 35 |
| 10.27 | 4.3203 | 210 | 50 |
| 11.70 | 3.7983 | 002 | 40 |

TABLE 6-continued

| θ° | dÅ | h k l | $\frac{I}{I_o} \times 100$ |
|---|---|---|---|
| 11.87 | 3.7447 | 211 | 72 |
| 12.45 | 3.5728 | 102 | 60 |
| 13.55 | 3.2875 | 112 | 33 |
| 14.20 | 3.1399 | 202 | 34 |
| 15.75 | 2.8376 | 212 | 54 |
| 16.80 | 2.6649 | 302 | 19 |
| 18.15 | 2.4726 | | |

$$\begin{cases} a = 13.2858 \text{ Å} \\ c = 7.5069 \text{ Å} \end{cases}$$

After calcination in air for 3 hours at 540° C., 804° C. and 912° C., the solids have been analyzed through X-rays (see Tables 7, 8 and 9 hereinbelow). No loss in crystallinity is detected after each of these treatments.

TABLE 7

| θ° | dÅ | h k l | $\frac{I}{I_o} \times 100$ |
|---|---|---|---|
| 3.87 | 11.412 | 100 | 100 |
| 5.80 | 7.6220 | 001 | 22 |
| 6.70 | 6.6019 | 110 | 65 |
| 7.05 | 6.2757 | 101 | 12 |
| 7.75 | 5.7118 | 200 | 11 |
| 9.75 | 4.5483 | 201 | 19 |
| 10.37 | 4.2790 | 210 | 57 |
| 11.66 | 3.8111 | 300 | 29 |
| 11.86 | 3.7478 | 211 | 98 |
| 12.45 | 3.5728 | 102 | 64 |
| 13.35 | 3.3358 | 220 | 20 |
| 13.52 | 3.2947 | 112 | 31 |
| 14.22 | 3.1356 | 202 | 43 |
| 15.35 | 2.9097 | 311 | 18 |
| 15.65 | 2.8553 | 400 | 66 |
| 15.77 | 2.8341 | 212 | 73 |
| 16.80 | 2.6649 | 302 | 28 |
| 18.15 | 2.4726 | | |

$$\begin{cases} a = 13.1642 \text{ Å} \\ c = 7.5272 \text{ Å} \end{cases}$$

TABLE 8

| θ° | dÅ | h k l | $\frac{I}{I_o} \times 100$ |
|---|---|---|---|
| 3.85 | 11.471 | 100 | 100 |
| 5.90 | 7.4932 | 001 | 22 |
| 6.72 | 6.5823 | 110 | 73 |
| 7.05 | 6.2757 | 101 | 13 |
| 7.75 | 5.7118 | 200 | 12 |
| 9.75 | 4.5483 | 201 | 19 |
| 10.27 | 4.3203 | 210 | 58 |
| 11.67 | 3.8079 | 300 | 30 |
| 11.87 | 3.7447 | 211 | 106 |
| 12.50 | 3.5587 | 102 | 73 |
| 13.50 | 3.2995 | 112 | 28 |
| 14.20 | 3.1399 | 202 | 44 |
| 15.65 | 2.8553 | 200 | 71 |
| 15.75 | 2.8376 | 210 | 81 |
| 16.80 | 2.8679 | 302 | 27 |
| 18.15 | 2.4726 | | |

$$\begin{cases} a = 13.2858 \text{ Å} \\ c = 7.4833 \text{ Å} \end{cases}$$

TABLE 9

| θ° | dÅ | h k l | $\frac{I}{I_o} \times 100$ |
|---|---|---|---|
| 3.90 | 11.324 | 100 | 100 |
| 5.92 | 7.4680 | 001 | 17 |
| 6.75 | 6.5532 | 110 | 69 |
| 7.07 | 6.2580 | 101 | 11 |
| 7.76 | 5.7045 | 200 | 12 |
| 9.80 | 4.5253 | 201 | 15 |
| 10.30 | 4.3078 | 210 | 54 |
| 11.72 | 3.7919 | 002 | 27 |
| 11.90 | 3.7353 | 211 | 92 |
| 12.50 | 3.5587 | 102 | 62 |
| 13.32 | 3.3432 | 220 | 17 |
| 13.55 | 3.2875 | 112 | 25 |
| 14.25 | 3.1291 | 202 | 39 |
| 15.37 | 2.9060 | 311 | 13 |
| 15.70 | 2.8464 | 400 | 60 |
| 15.80 | 2.8289 | 212 | 68 |
| 16.80 | 2.6649 | 320 | 22 |
| 18.15 | 2.4726 | | |

$$\begin{cases} a = 13.0605 \text{ Å} \\ c = 7.4934 \text{ Å} \end{cases}$$

The specific area of the sample calcined at 540° C. is 413 m²g⁻¹ and its porous volume 0.25 cm³g⁻¹. After treatment at 804° C. these values are 360 m²g⁻¹ and 0.21 cm³g⁻¹ respectively.

The aspect of the crystals as observed in electronic scanning microscopy is not modified after calcination at 804° C.

After exchange by protons and activation the obtained product used as a catalyst is able to adsorb 7.8% by weight of cyclohexane at 20° C. under a pressure of 84 Torrs and 18.7% by weight of water at 20° C. under 20 Torrs.

Catalytic activity was evaluated in the hydratation of n-butene in a static reactor of 110 cm³. At 200° C. under 65 atmospheres of pressure (400 mg of catalyst, 0.21 mole of olefin, 0.92 mole of water), the conversion after 2 hours of reaction is 3.1 moles %, which corresponds to a yield of 1.45 mmoles $h^{-1}g^{-1}$.

Under the same conditions, a conventional offretite ($SiO_2/Al_2O_3 \sim 7$) exchanged analogously leads to a conversion of 1.8 moles %, i.e. a yield of 0.83 mmole $h^{-1}g^{-1}$.

Furthermore, in the reaction of cyclohexane at 450° C. with a spatial speed of 1 $h^{-1}$, a conversion of 17% is obtained, stable in the course of time (unchanged after 24 hours of work). The products formed contain 20% of gas ($C_1$-$C_3$), 10% of $C_4$-$C_5$-hydrocarbons, 50% of isomers (methylcyclopentane) and 20% of aromatics (toluene and xylenes).

Under the same conditions, decaline is converted with a transformation rate of 10% and a selectivity of 70% into gasolines.

EXAMPLE 5

A "nucleation" gel A is prepared having the following molar composition:

3.5$K_2O$; 3.5$Na_2O$; 2.97$(Me_4N)_2O$; $Al_2O_3$; 17.5$SiO_2$; 325$H_2O$ from: water 15 g; KOH 1.1 g; NaOH 0.78 g; TMAOH, 5$H_2O$ 3.05 g; kaolin 0.73 g and silica 2.63 g.

Such gel is left to age for 3 days at ambient temperature.

A second "synthesis" gel B having the following composition: 6$K_2O$; $Al_2O_3$; 15.3$SiO_2$; 280$H_2O$ is obtained from: water 15 g; KOH 2.2 g; metakaolin 0.73 g; and silica 2.63 g.

An AB mixture with 5% of A is made. It is stirred at ambient temperature for 1 hour, transferred into a sealed phial and heated at 110° C. for 72 hours without stirring.

The solid obtained after washing and drying presents an X-ray diffractogram characterizing the very pure offretite according to the invention. The solid heated to 920° C. does not present any loss of crystallinity to X-ray inspection.

EXAMPLES 6, 7, 8 AND 9

A gel having the following stoichiometric composition:

$6K_2O$; $0.2(Me_4N)_2O$; $Al_2O_3$; $15.3SiO_2$; $260H_2O$; is prepared from: $H_2O$ 15 g; KOH 2.2 g; TMAOH, $5H_2O$, 0.128 g; metakaolin 0.73 g and silica 2.63 g.

Such gel is separated into four portions. These are transferred into glass tubes, sealed and heated without stirring for 17 hours, the first at 110° C. (Example 6), the second at 160° C. (Example 7), the third at 170° C. (Example 8) and the fourth at 180° C. (Example 9).

The four solids obtained present an X-ray diffractogram characterizing the offretite and an aspect of MEB crystals similar to that described above.

The chemical analysis leads to the following compositions:

| Example | 6 | 7 | 8 |
|---|---|---|---|
| $Al_2O_3$ | 1 | 1 | 1 |
| $SiO_2$ | 7.2 | 7.4 | 7.5 |
| $K_2O$ | 0.7 | 0.84 | 0.85 |
| $Na_2O$ | 0.02 | — | — |
| $(Me_4N)_2O$ | 0.3 | 0.17 | 0.2 |

EXAMPLE 10

A mixture of the following stoichiometric composition:

$6.94K_2O$; $1.85(Me_4N)_2O$; $Al_2O_3$; $17.5SiO_2$; $411H_2O$ prepared from: water 20 g; KOH 2.2 g; TMAOH, $5H_2O$, 1.9 g; kaolin 0.73 g; and silica 2.63 g is treated at 150° C. for 28 hours under stirring. The obtained solid is similar to that described in the preceding Examples.

Chemical composition: $Al_2O_3$; $10.8SiO_2$; $0.48K_2O$; $0.02Na_2O$; $0.5(Me_4N)_2O$.

EXAMPLE 11

A solution is crystallized, having the same stoichiometry as that of Examples 6 to 9 but prepared as follows:

A solution is made containing: water 15 g; KOH 2.2 g; metakaolin 0.73 g; and silica 2.63 g, which is stirred up to homogenization, then it is allowed to age for 48 hours at the ambient temperature.

To this aged mixture there is added 0.128 g of TMAOH, $5H_2O$ and it is stirred for 1 hour.

The whole of it is then heated for 72 hours at 110° C. in a sealed vessel without stirring.

The recovered solid has an X-ray diffractogram characterizing the offretite and presents itself in form of crystals such as defined above.

Elementary analysis leads to the following composition:

| $Al_2O_3$ | 0.8 $K_2O$ |
|---|---|
| 6.9 $SiO_2$ | 0.02 $Na_2O$ |
| | 0.16 $(Me_4N)_2O$. |

EXAMPLE 12

A solution having the same stoichiometric composition as in the Examples 6 to 9, and 11 is prepared from water 16.57 g; KOH 2.2 g; TMA Cl (tetramethylammonium chloride) 0.144 g; metakaolin 0.73 g; and silica 2.63 g.

After crystallization for 72 hours at 110° C. in a sealed vessel without stirring, the obtained solid corresponds to the offretite presenting the same structural characteristics as those described in the other Examples.

Furthermore, for all the above described offretites in their protonic form, the measurements of the stress index effected by competitive catalytic cracking of n-hexane and methyl-pentane leads to values of between 0.8 and 2, stable in the course of time of use of the catalysts.

It will be understood that this invention was only illustrated by the Examples in a purely explanatory and not at all limitative manner and that any useful modification can be entered therein without departing from its scope.

We claim:

1. A crystalline aluminosilicate in the form of hexagonal prisms having an X-ray diffraction pattern of pure offretite, microdiffraction graphs of a perfectly organized offretite, nitrogen porous volume and surface of pure offretite, a constraining index ranging from about 0.8 to about 2, a stability at a temperature up to at least about 1050° C., and adsorption rate of 6 to 10% by weight of cyclohexane at 20° C. under a pressure of 84 Torrs, and from 15 to 20% of water under a pressure of 20 Torrs.

2. The crystalline aluminosilicate of claim 1 having a conversion rate of 17% stable in the course of time in the conversion of cyclohexane to 20% of $C_1$–$C_3$ hydrocarbons, 10% of $C_4$–$C_5$ hydrocarbons, 50% of isomers, and 20% of aromatics selected from the group consisting of toluene and xylene at 450° C. with a spatial speed of 1 $h^{-1}$.

3. The crystalline aluminosilicate of claim 1 wherein the hexagonal prisms have well-defined edges of a length of from about 0.5 to about 2.5 micrometers and a width of from about 0.1 to about 1 micrometer.

* * * * *